United States Patent
Rimmi

[11] 3,892,946
[45] July 1, 1975

[54] CONTROL SYSTEM FOR AN ELECTRICAL HEATING DEVICE, AND PARTICULARLY FOR AN ELECTRICAL SAUNA STOVE

[75] Inventor: Pentti Ilmari Rimmi, Hanko, Finland

[73] Assignee: Oy Helo-Tehtaat-Helo Fact. Ltd., Hanko, Finland

[22] Filed: Sept. 25, 1973

[21] Appl. No.: 400,622

[30] Foreign Application Priority Data
Sept. 26, 1972 Finland................................... 2614

[52] U.S. Cl.................................. 219/486; 219/483
[51] Int. Cl. .............................................. H05b 1/02
[58] Field of Search ........... 219/483, 484, 485, 486; 307/33

[56] References Cited
UNITED STATES PATENTS
2,046,008   6/1936   von Sauer.......................... 219/486
FOREIGN PATENTS OR APPLICATIONS
158,067   3/1957   Sweden............................... 219/483

Primary Examiner—J. D. Miller
Assistant Examiner—Fred E. Bell
Attorney, Agent, or Firm—Waters, Schwartz & Nissen

[57] ABSTRACT

A control system for an electrical heating device and in particular for an electrical sauna stove. The system comprises three heating resistances or groups of heating resistances connected to different phases as well as a coil switch arrangement which can be controlled by means of a control switch and possibly by means of a temperature limiter. A temperature controller has been arranged so as to connect and disconnect, respectively, the loads of the different resistances stepwise, for example, with intervals of 5° to 10°C. Each of the said loads consists of a resistance connected to one phase or of a part of such resistance. The temperature controller consists of an at least three-pole controller arrangement for each phase and the coil switch arrangement consists of one three-pole coil switch connected in series with the controller arrangement.

5 Claims, 6 Drawing Figures

3,892,946

CONTROL SYSTEM FOR AN ELECTRICAL HEATING DEVICE, AND PARTICULARLY FOR AN ELECTRICAL SAUNA STOVE

FIELD OF INVENTION

The present invention relates to a control system for an electrical heating device, and in particular for an electrical sauna stove, of the type comprising three heating resistances or groups of heating resistances connected to different phases.

SUMMARY OF INVENTION

In accordance with the invention there is provided a system which comprises a coil switch arrangement which can be controlled by means of a control switch and possibly by means of a temperature limiter, as well as a temperature controller which has been arranged so as to connect and disconnect, respectively, the component loads of the different resistances stepwise, for example, with intervals of 5° to 10°C.

BRIEF DESCRIPTION OF DRAWING

The system in accordance with the invention will be examined below more closely with the aid of example embodiments as illustrated in accordance with the attached drawings.

DETAILED DESCRIPTION

Figure 1:
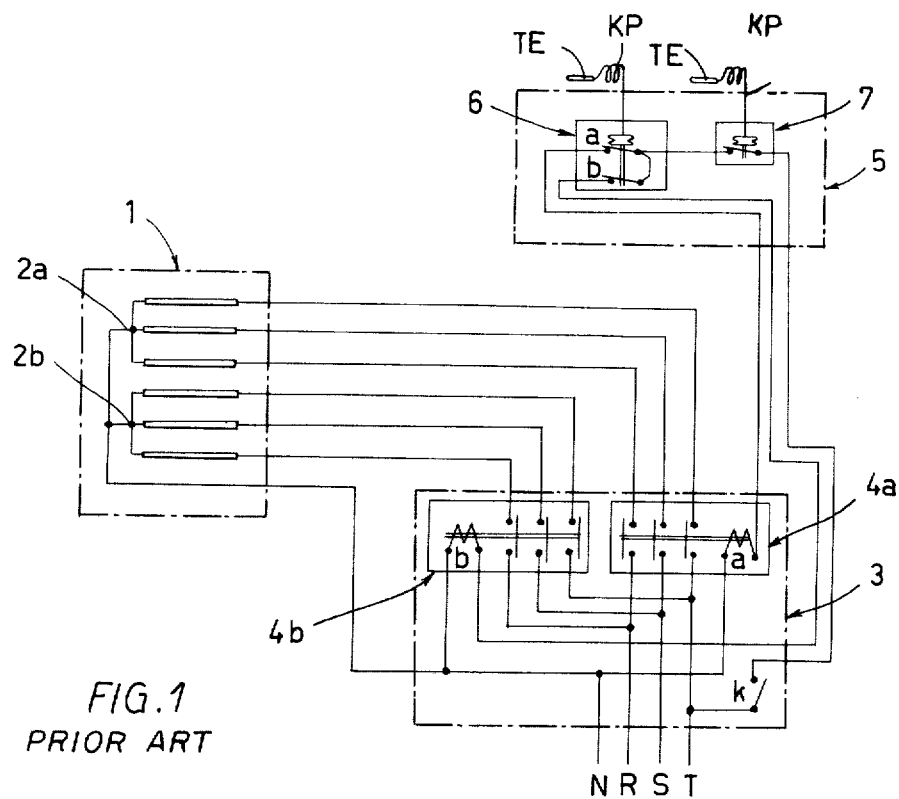
FIG. 1 shows, as has already come out, the switching diagram of a known control system as applied to an electrical sauna.

In accordance with known methods the controlling of an electrical stove (e.g., the controlling of the temperature in a sauna) takes place as follows (FIG. 1);

In order to obtain a more uniform temperature, the load of the electrical stove 1 (having heating elements 2a and 2b) is divided into two 3-phase component loads 2a and 2b, each of which is controlled by its own coil switch 4a and 4b in a control center 3 placed outside the sauna. On the other hand, the coil switches 4a and 4b are controlled by a separate temperature controller 5 placed in the sauna, which controller comprises a two- or three-pole temperature controller 6, whose contacts a and b are adjusted so as to operate at different temperatures with a difference in temperature of about 5° to 10°C (e.g., $t_a = 90°C$ and $t_b = 95°C$; a possible third contact operates at the same temperature either with contact a or with contact b) and a one-pole temperature limiter 7.

When the switch k of the control center 3 closed, the coils a and b of the coil switches 4a and 4b in the control center 3 receive the voltage through the separate temperature controller 5, temperature limiter 7 and through the contacts a and b of the temperature controller 6, whereby the coil switches 4a and 4b are closed and the heating elements 2a and 2b of the electrical stove 1 receive the voltage and become heated thus heating the stove stones and the air in the sauna. If the temperature controller 6 has been adjusted, for example, so that its contacts a and b operate at temperatures $t_a = 90°C$ and $t_b = 95°C$, the heating elements 2a and 2b of the electrical stove are heated until the temperature of 90°C prevails in the sauna, at which time the contact a of the temperature controller 6 is opened, the coil a of the coil switch 4a receives no voltage, and the coil switch 4a is opened thus disconnecting the current from the heating element 2a of the electrical stove 1, so that only the heating elements 2b of the electrical stove 1 remain heating the stove stones and the air in the sauna unit the temperature in the sauna is 95°C. At this time the contact b of the temperature controller 6 is opened and makes the coil b of the coil switch 4b free of voltage; the coil switch 4b is opened and disconnects the current from the heating elements 2b of the electrical stove, whereby the air in the sauna starts cooling down.

When the temperature in the sauna sinks below 95°C, the contact b of the temperature controller 6 is closed thus giving the voltage to coil b of the coil switch 4b, at which time the coil switch 4b is closed thus connecting the current to the heating elements 2b, and the temperature in the sauna again starts rising to 95°C.

If the load of the sauna is so high that the heating elements 2b cannot maintain a temperature of 95°C but the temperature sinks below 90°C, the contact a of the temperature controller 6 is closed, whereby the coil a of the coil switch 4a receives the voltage and the coil switch 4a is closed thus connecting the current to the heating elements 2a. The stove then operates at its full capacity.

When the temperature in the sauna becomes too high, for example as a result of the temperature controller 6 being damaged, the contact of the temperature limiter 7 is opened and disconnects the current from the coils a and b of the coil switches 4a and 4b, whereby the coil switches are opened and disconnect the current from the heating resistances 2a and 2b and the sauna is cooled down.

A control system of a sauna stove in accordance with what has been described above has several drawbacks. Thus, the controlling of the temperature in the sauna takes place only at two steps (involving heating resistances 2a and 2b), one or more coil switches of the system operate(s) continually in accordance with the impulses given by the temperature controller, which wears out the coil switches, moreover, the banging resulting from continual operation of the coil switches is disturbing, two coil switches are required in the control center, when the coil switches operate continually, their contacts are worn and they may be welded together, whereby the operation of the temperature limiter can, when the sauna is overheated, not disconnect the stove from the electrical supply network; the excess temperature protection is therefore uncertain.

A purpose of the present invention is to eliminate the above drawbacks. The control system in accordance with the invention is mainly characterized in that each of the said component loads consists of a resistance connected to one phase or of a part of such resistance, and that the temperature controller consists of an at least three-pole controller arrangement for each phase and the coil switch arrangement consists of one three-pole coil switch connected in series with the controller arrangement. Among the advantages of the control system in accordance with the invention should be mentioned that the controlling of the temperature in the sauna has three steps, so that a better uniformity of the temperature is obtained in the sauna as compared with the known methods, only one coil switch is required in the control center, the service life and reliability of operation of the coil switch are better and the operation is less disturbing than in the known methods, because the coil switch functions only as the main switch and as the switch of excess temperature protection, the reliability of operation of the coil switch as a switch of excess temperature protection is better than in the known methods, because it operates seldom ( i.e., when the sauna is switched on for heating and when the current is switched off from the stove after the sauna bath).

Figure 2:
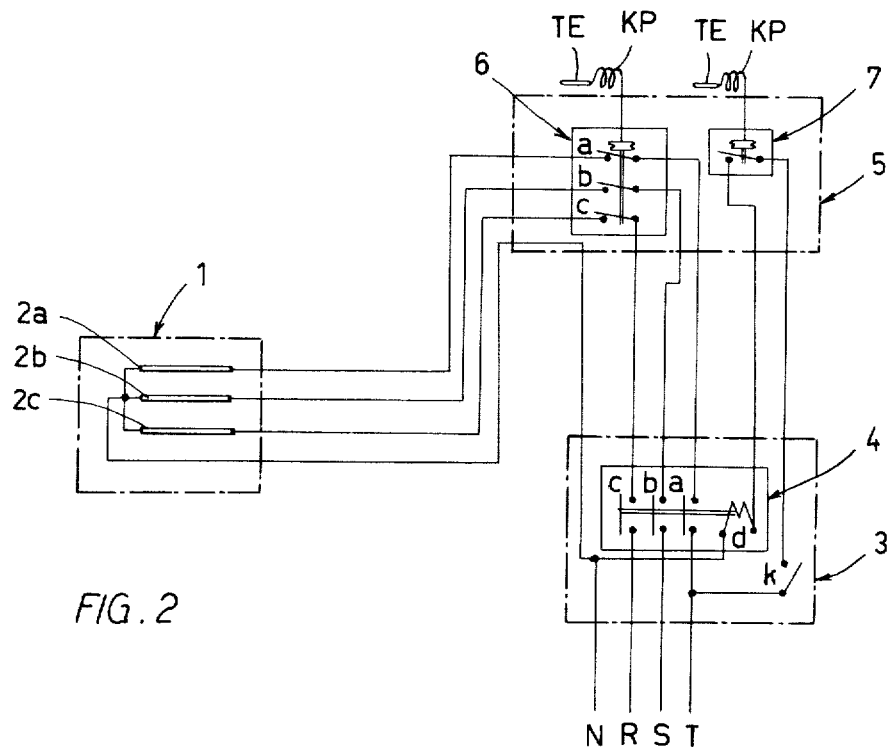
FIGS. 2 to 6 show switching diagrams of different embodiments of the control system in accordance with the invention, likewise as applied to an electrical sauna.

In the solution shown in FIG. 2 (case A) the component capacities 2a, 2b and 2c of the electrical stove 1 are controlled by means of a separate temperature controller 5 placed in the sauna, which controller comprises a three or more-pole temperature controller 6, whose contacts a, b and c operate at different temperatures with temperature differences of about 5° to 10°C (for example, $t_a = 90°C$, $t_b = 95°C$, and $t_c = 100°C$), and a one-pole temperature limiter 7. In the control center 3 inside or outside the sauna, there is a control switch k and a three-pole or more coil switch 4, whose main contacts a, b and c have been switched in series with the contacts a, b and c of the temperature controller 6 and whose coil d is in series with the temperature limiter 7.

The novel control system of an electrical stove operates as follows: When the control switch k of the control center 3 is closed, the coil d of the coil switch 4 receives the voltage through the temperature limiter 7, and the main contacts, a, b and c of the coil switch 4 are closed (as well as possible auxiliary contacts are opened of closed) thus connecting the current through the contacts a, b and c of the temperature controller 6 to the heating elements 2a, 2b and 2c of the electrical stove, which elements are heated and heat the stove stones and the air in the sauna. Each of the heating elements 2a, 2b and 2c can consist of one or more heating resistances (tube heaters).

If the temperature controller 6 has been adjusted, for example, so that its contacts a, b and c operates at the temperatures $t_a = 90°C$, $t_b = 95°C$, and $t_c = 100°C$, the heating elements 2a, 2b and 2c of the electrical stove 1 are heated until the temperature in the sauna is 90°C, at which time the contact a of the temperature controller 6 is opened and disconnects the current from the heating element 2a. When the temperature has risen to the value of 95°C, the contact b of the temperature controller 6 is opened and disconnects the current from the heating element 2b, and after the temperature has risen to the value 100°C, the contact c of the temperature controller 6 is opened and disconnects the current from the heating element 2c. When the temperature is lowered in the sauna, the operation is reversed so that the electrical stove 1 has a three-step controlling.

When the temperature in the sauna becomes dangerously high, for example as a result of the temperature controller 6 being damaged, the contact of the temperature limiter 7 is opened thus disconnecting the voltage from the coil d of the coil switch 4 in the control center 3, whereby the main contacts a, b and c of the coil switch 4 are opened and disconnect the current from all the heating elements (2a, 2b and 2c) of the electrical stove, so that the sauna is cooled down.

Figure 3:
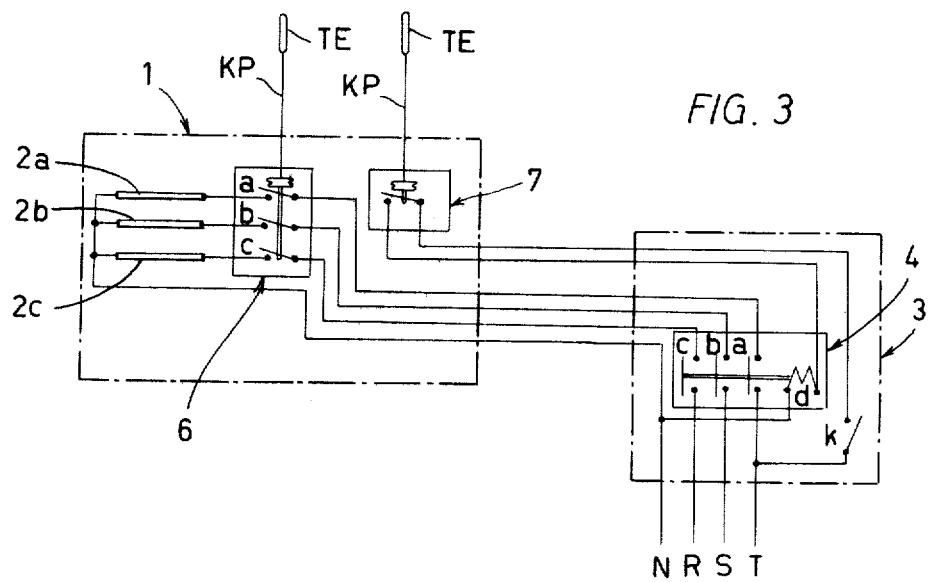

The novel control system can also be accomplished in the following different ways:

B. The temperature controller 6 and the limiter 7 are placed inside the electrical stove or in connection with the same (FIG. 3). In this case their capillary tubes KP must be so long that the sensing units TE can be placed at the correct location in the sauna.

Figure 4:
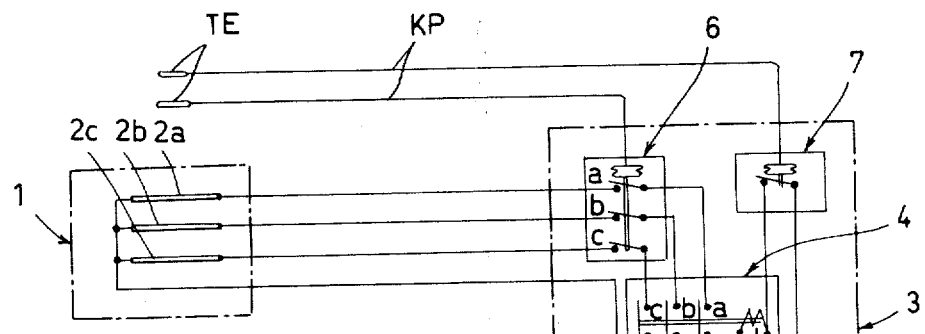

C. The temperature controller 6 and the limiter 7 are placed inside the control center 3 or in connection with same (FIG. 4). In this case their capillary tubes KP must be so long that the sensing units TE can be placed at the correct location in the sauna.

Figure 5:
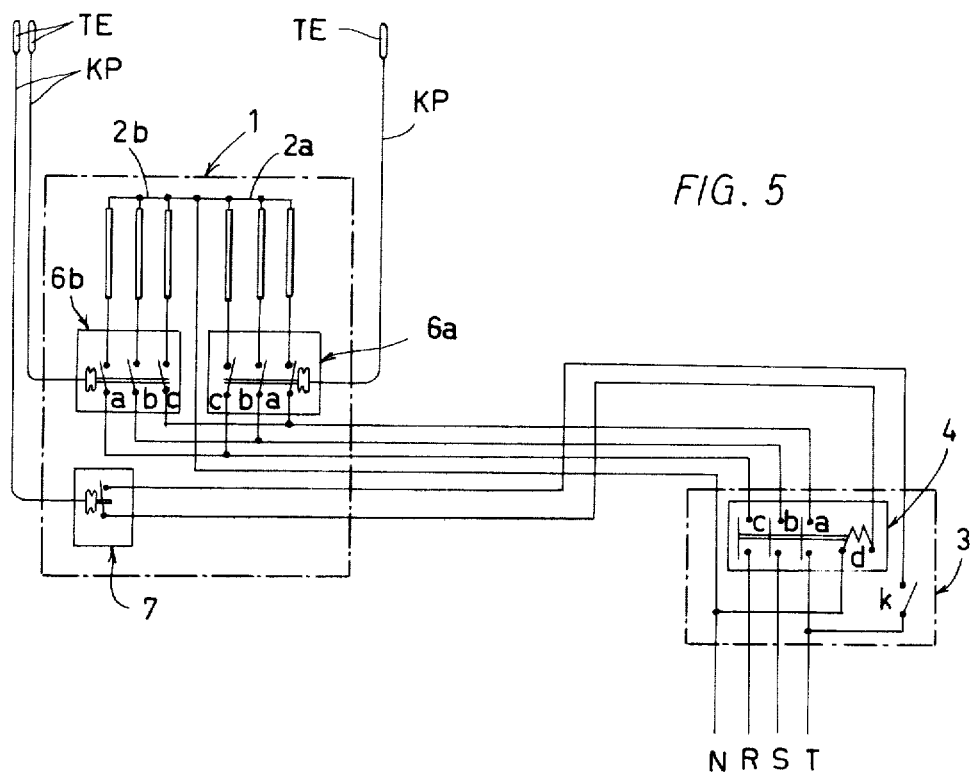

D. In the cases A, B and C the number of temperature controllers can also be two or more, in which case even high-capacity electrical stoves can be controlled. In FIG. 5 two temperature controllers 6a and 6b have been placed in the case B by way of example.

E. In the cases B, C and D the coil switch 4 in the control center 3 can also be placed in the stove 1 or in connection with same, whereby the control center 3 comprises only the control switch k.

F. In the cases B, C and D the entire control center 3 can be placed in the stove 1 or in connection with the same.

G. In the cases A, B, C, D, E, and F the control switch k in the control center 3 can be substituted for by a clock device which accomplishes the connecting of current, the disconnecting of current, or both connecting and disconnecting at the desired time.

Figure 6:
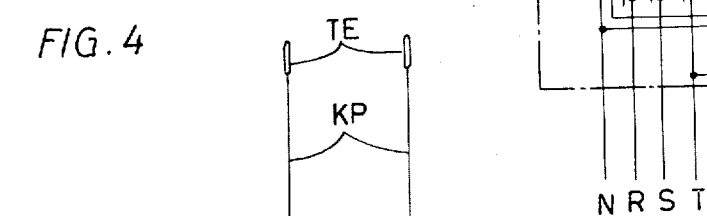
Figure 6:
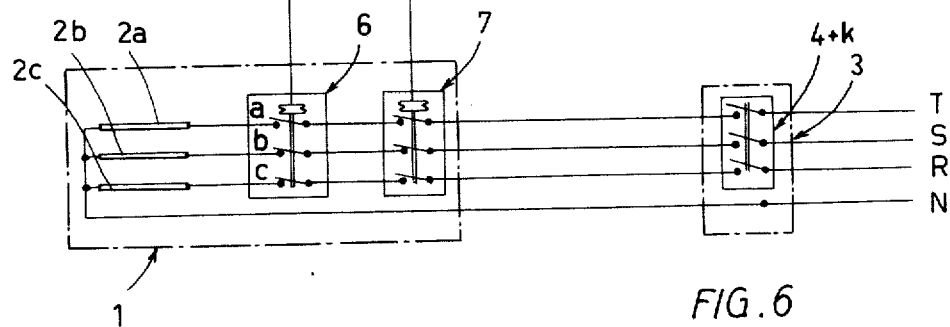

H. In the cases A, B and C, with small electrical stoves, the coil switch 4 and the control switch k of the control center 3 can be substituted for by an at least three-pole switch or by a clock device which carries out the connecting of current, disconnecting of current, or both connecting and disconnecting at the desired time. Moreover, an at least three-pole temperature limiter must be used. An example of this is the switching corresponding to the case B in FIG. 6. A switch or a substituting clock device can, of course, also be placed at the stove or in connection with same.

Although in the example embodiments described above the application of the control system in accordance with the invention to an electrical sauna stove has been described, it it evident that the novel control system is equally well suitable for use in connection with other types of electrical heating devices as well.

I claim:

1. A control system for an electrical heating device, and particularly for an electrical sauna stove, comprising: three heating resistance arrangements adapted for being connected to three different phases, respectively, a coil switch arrangement comprising one three-pole coil switch, a control switch controlling said coil switch arrangement, a temperature controller connected in series with said coil switch arrangement and comprising an at least three-pole controller arrangement for each phase and arranged so as to connect and disconnect in stepwise manner, with certain preselected temperature intervals, the component loads of said respective resistance arrangements, said temperature controller being placed inside the heating device.

2. A control system in accordance with claim 1 wherein the coil switch arrangement is placed in the heating device.

3. A control system in accordance claim 1 wherein the control switch is a clock device.

4. A control system in accordance with claim 1, in which the coil switch arrangement and the control switch thereof are constituted by a multi-pole switch.

5. A control system as claimed in claim 1, further comprising a temperature limiter means for the control of the coil switch arrangement.

* * * * *